(No Model.) 6 Sheets—Sheet 2.

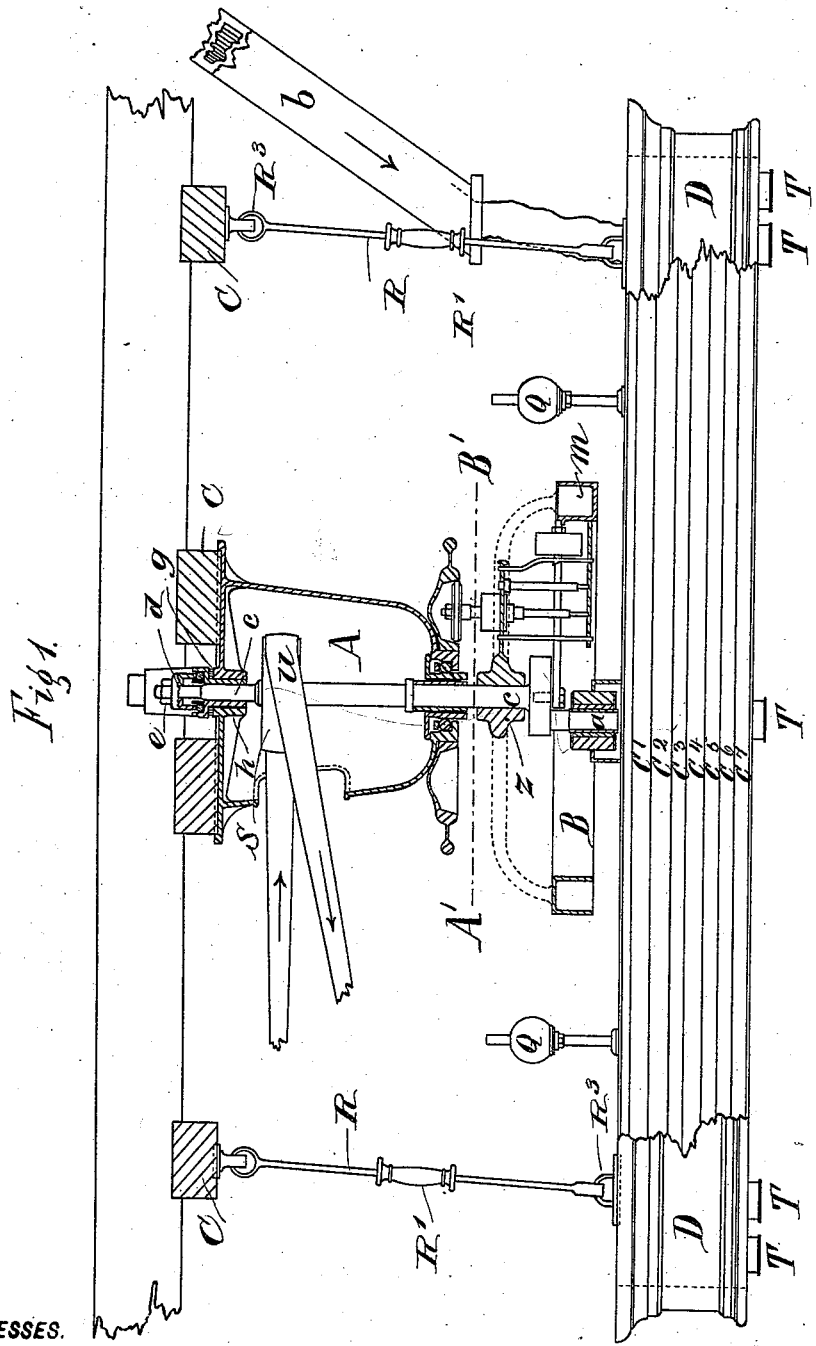

N. NIELSEN.
BOLTER.

No. 549,813. Patented Nov. 12, 1895.

WITNESSES.
INVENTOR:
N Nielsen
BY
ATTORNEYS

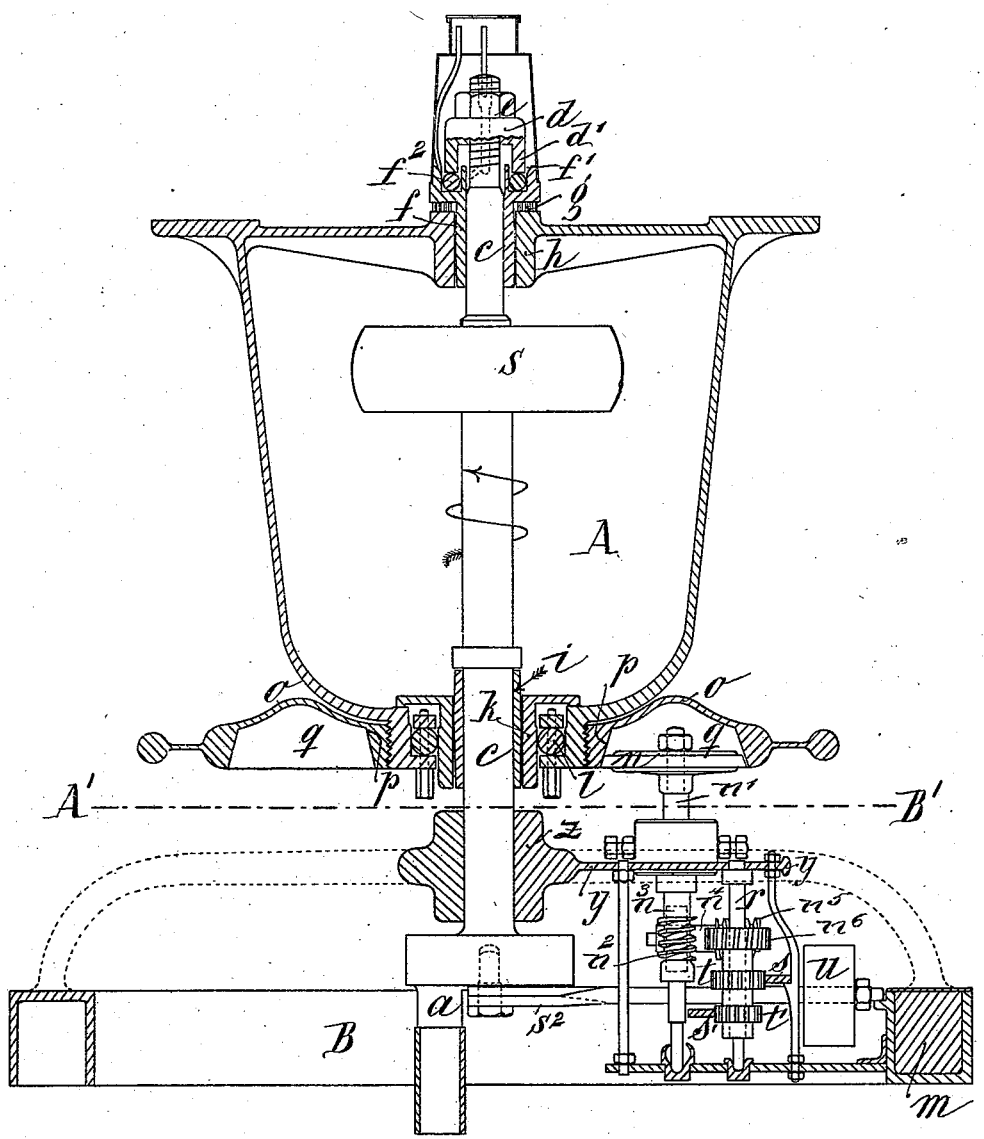

(No Model.) 6 Sheets—Sheet 4.

N. NIELSEN.
BOLTER.

No. 549,813. Patented Nov. 12, 1895.

WITNESSES:
C. Sedgwick
J. W. Hanaford

Figure 5B:
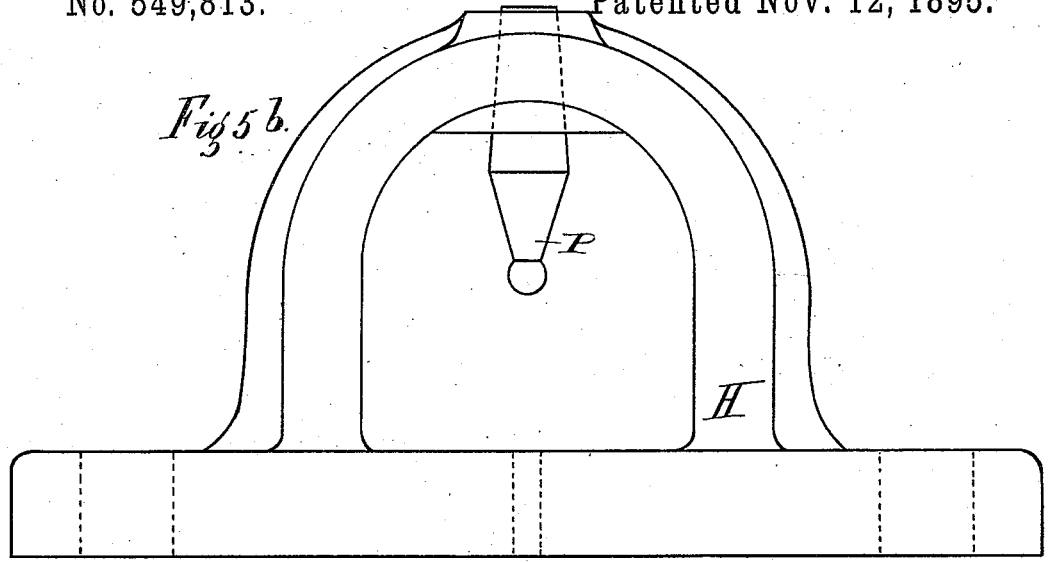
Figure 5A:
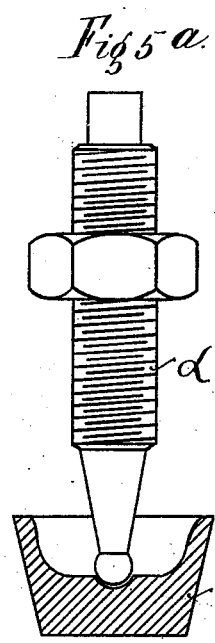

INVENTOR:
N. Nielsen
BY Munn & Co.
ATTORNEYS (No Model.) 6 Sheets—Sheet 5.
N. NIELSEN.
BOLTER.
No. 549,813. Patented Nov. 12, 1895.
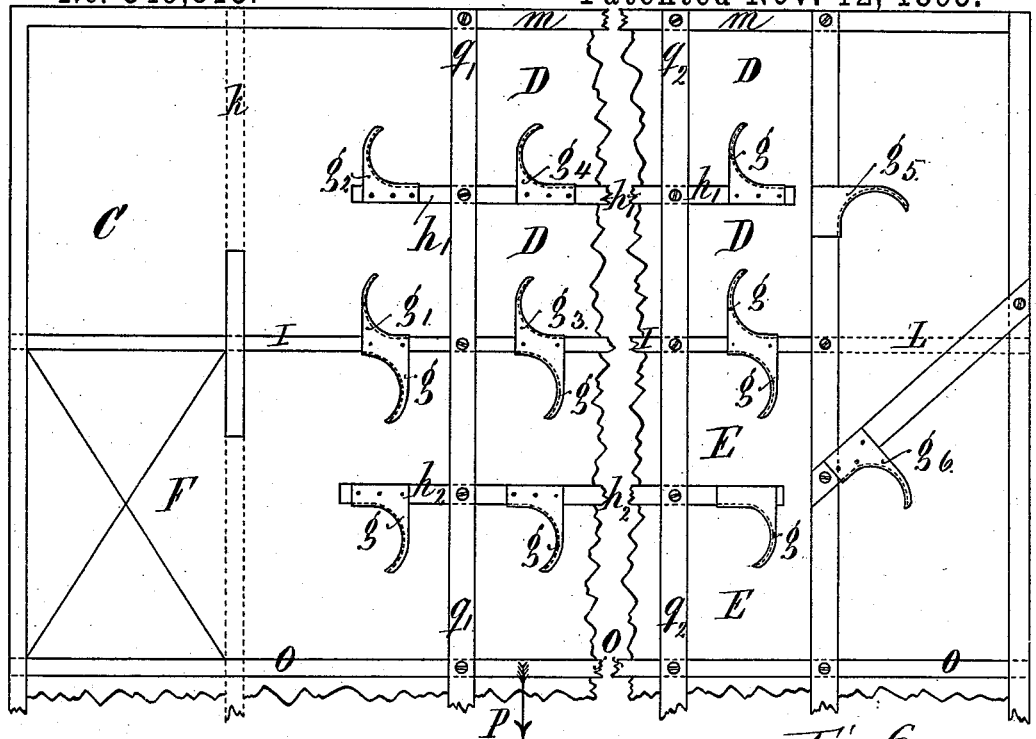
Fig. 6.
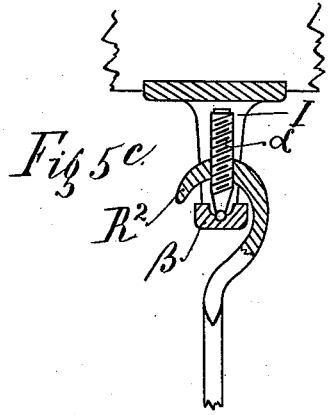
Fig. 5c
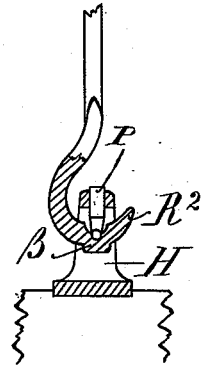
WITNESSES.
C. Sedgwick
J. W. Hanaford.
INVENTOR:
N. Nielsen
BY Munn & Co.
ATTORNEYS (No Model.) 6 Sheets—Sheet 6.
N. NIELSEN.
BOLTER.
No. 549,813. Patented Nov. 12, 1895.
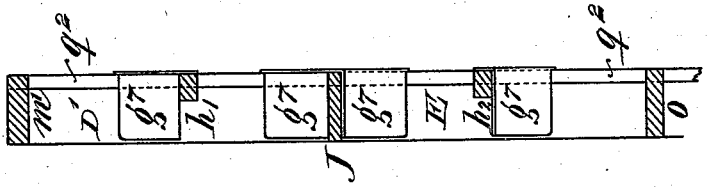
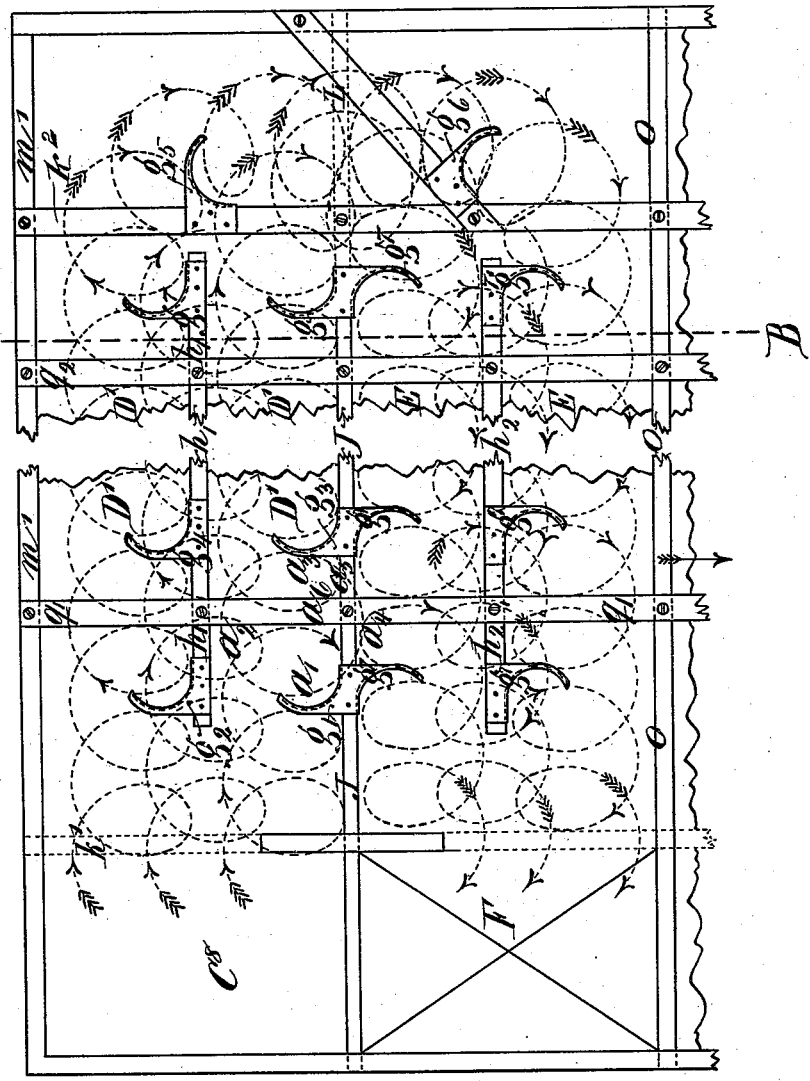
WITNESSES.
INVENTOR:
N. Nielsen
BY
Munn & Co.
ATTORNEYS

UNITED STATES PATENT OFFICE.

NIELS NIELSEN, OF COPENHAGEN, DENMARK.

BOLTER.

SPECIFICATION forming part of Letters Patent No. 549,813, dated November 12, 1895.

Application filed February 24, 1894. Serial No. 501,371. (No model.) Patented in Sweden March 19, 1892, No. 4,044; in Germany March 26, 1892, No. 71,213; in Norway March 27, 1892, No. 2,673; in Denmark June 6, 1892, No. 188/92, and in Austria-Hungary December 30, 1893, No. 45,062.

*To all whom it may concern:*

Be it known that I, NIELS NIELSEN, manufacturer, of Nörrebrogade 58, Copenhagen, Denmark, have invented certain new and useful Improvements in Bolters, of which the following is a specification, for which I have obtained patents as follows: in Austria-Hungary, No. 45,062, dated December 30, 1893; in Germany, No. 71,213, dated March 26, 1892; in Sweden, No. 4,044, dated March 19, 1892; in Norway, No. 2,673, dated March 27, 1892, and in Denmark, No. 188/92, dated June 6, 1892.

This invention relates to bolters having a gyratory motion in an essentially horizontal plane, and has for its object to reduce or prevent irregular and injurious vibrations of the bolter-frame.

One of the features of the invention consists in accomplishing an automatic compensation for variations in the weight of the material fed to the bolter, so as to automatically maintain the bolter-frame in equilibrium.

A further object of the invention is to prevent upward or downward vibrations of the bolter-frame and maintain it in its original plane of motion by properly adjusting the center of gravity of the bolter in a vertical direction.

To these ends the invention consists of certain features of construction and combinations of the same, that will be fully described hereinafter. The points of novelty will then be specified in the claims.

Reference is to be had to the accompanying drawings, which form a part of this specification, and in which—

Figure 3:
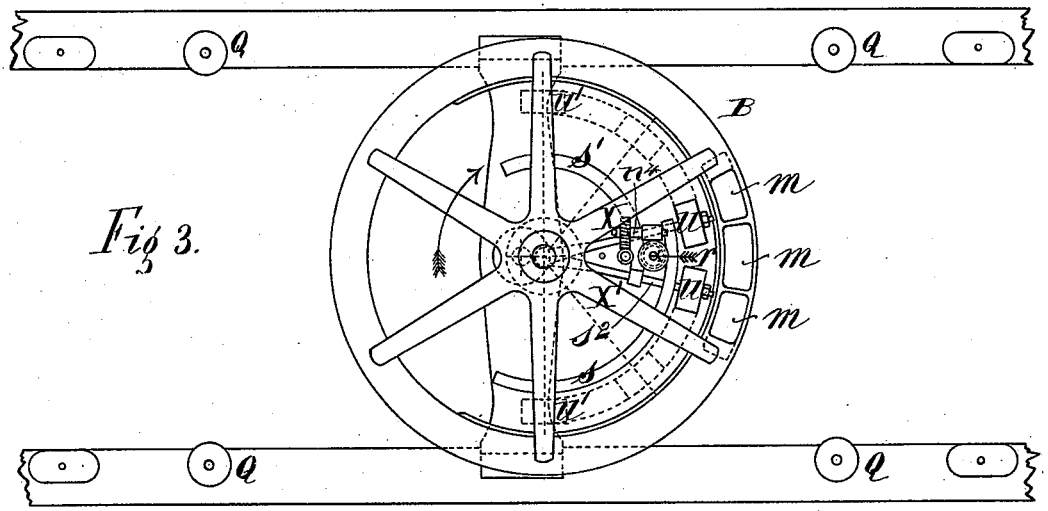
Figure 2:
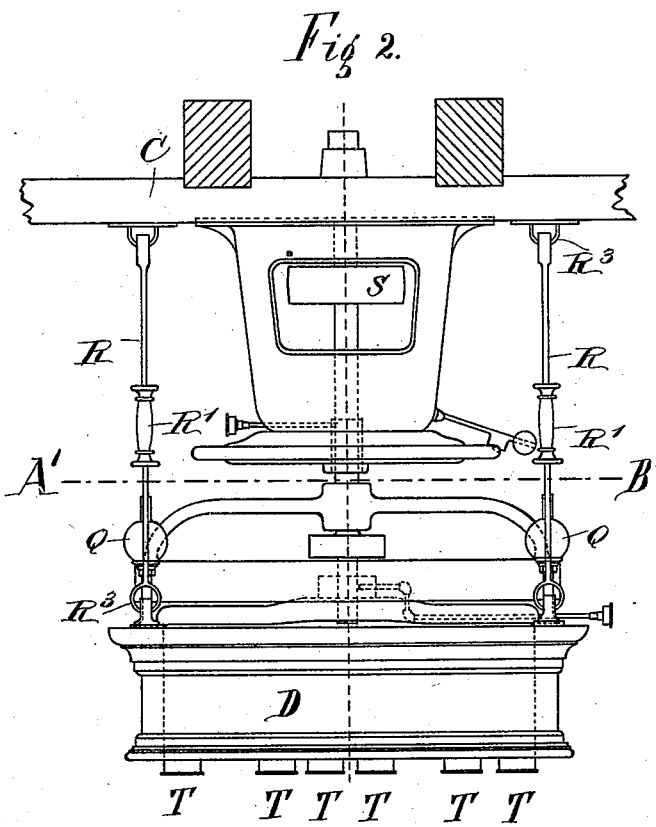

Figure 1 is a longitudinal broken elevation of a gyrating bolter embodying the improvements which constitute the present invention, parts of the improvements being shown in section. Fig. 2 is a side elevation. Fig. 3 is a sectional plan on the line A' B' of Fig. 1 with parts removed. Fig. 4 is an enlarged detail view of the central portion of the bolter shown in Fig. 1. Fig. 3 is a broken view showing one of the suspending-rods and its connections with the hanger and the bolter-frame. Figs. $5^a$ and $5^b$ are detail views, drawn on an enlarged scale, of the connection between the hanger and the suspending-rod and of the pivot-frame attached to the bolter, respectively. Fig. $5^c$ is a broken sectional elevation illustrating one of the suspending-rods and its connections. Fig. 6 is a broken plan view of the bolter, showing the conveying device. Fig. $6^a$ is a broken plan view illustrating the conveying device and the action thereof, and Fig. $6^b$ is a transverse section taken on the line A B of Fig. $6^a$.

Similar letters of reference denote similar parts throughout the several views.

Figure 5:
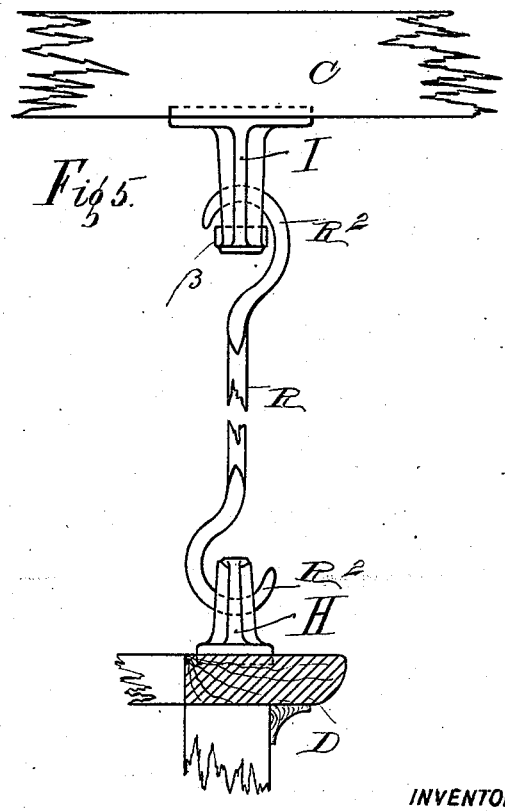

As illustrated in the drawings, the bolter frame or casing D is suspended by means of rods R, which may be constructed of one piece or in sections, connected by suitable couplings, such as shown at R'. The rods R are connected to the bolter-frame D and to the supporting-beams C or their equivalent in the manner illustrated in detail in Figs. 5, $5^a$, $5^b$, and $5^c$. The upper and the lower ends of the rods R are bent to form hooks $R^2$, as will be seen in Fig. 5, or complete eyes $R^3$, as shown in Figs. 1 and 2. To the upper hooks $R^2$ or eyes $R^3$ are secured downwardly-projecting pins $a$, whose lower ends are spherically rounded and are supported in bearings $\beta$ formed on or attached to the hanger I, which depends from the beam C. The bearing $\beta$ is dished, so as to serve as a receptacle for the lubricating material and is provided with a central depression of spherical curvature to receive the end of the pin $a$. The lower hooks $R^2$ or eyes $R^3$ of the suspension-rods R have secured to them upwardly-facing dished bearings similar to or identical with the bearing $\beta$, shown in Fig. $5^a$, and the central depressions in the said bearing are adapted to be engaged by the globular ends of pins P, which project downwardly from a pivot frame or bracket H, secured to the bolter-casing D. The globular ends of the pins $a$ and P and the recessed bearings $\beta$ form together ball-and-socket joints, to which the lubricant has a permanent access. A very easy motion is thus insured, and the wear to which the said pins and bearings are subjected will be uniform and will be reduced to a minimum.

The means for imparting a gyrator motion to the bolter are shown best in Figs. 1 and 4, and consist of a shaft $c$, journaled in a casing A in a manner to be described presently, and provided with a crank-pin $a$, which is connected to the frame D of the bolter. The casing is secured to beams C or equivalent parts, and on the shaft $c$ is also secured a fly-wheel B, whose nave is designated $z$, and the fly-wheel carries counterweights $m$ on the side that is opposite to the crank-pin $a$. The purpose of these counterweights is to equilibrate the device when no material is on the bolter-sieves, so that the shaft $c$ will hang perfectly vertical without exerting any lateral strain on its bearings. The shaft is provided with a pulley S, adapted to receive a driving-belt $u$. The upper end of the shaft is screw-threaded and carries a nut $d$, locked in place by a check-nut $e$. A bearing $f$, provided with an annular groove $f'$, is located below the nut $d$, and the latter has an annular cylindrical flange $d'$, adapted to rest on a series of balls $f^2$, that are arranged in the channel or groove $f'$. The bearing-sleeve $f$ is supported on a rubber ring $g$, which in its turn is carried by the central socket $h$ of the casing A. The outer surface of the sleeve $f$ is not cylindrical, but somewhat conical, for a purpose that will appear hereinafter.

The lower bearing of the shaft $c$ consists primarily of a sleeve $i$, whose outer surface is similar to that of the sleeve $f$. The sleeve $i$ is connected to a second exterior sleeve $k$ by means of a transverse pin. (Not shown.) A ring $l$, made of rubber, felt, a coiled spring, or other elastic material, encircles the sleeve $k$, for a purpose presently to be stated. The yielding ring $l$ is held in a central recess at the lower end of the casing A, and the sleeve $k$ also engages with the inner surface of the casing.

To the lower end of the stationary casing A is secured a ring $o$, provided with an annular groove $q$. Into this groove projects a friction-wheel $n$, mounted to revolve with a shaft $n'$. The diameter of the friction-wheel $n$ is somewhat less than the width of the groove $q$, and in its normal position the said wheel does not engage with either the inner or the outer surface of the groove. The shaft $n'$ carries a worm $n^2$, engaging a worm-wheel $n^3$ on a transverse shaft $n^4$, carrying another worm $n^5$, which by means of the worm-wheel $n^6$ is operatively connected to the shaft $r$, which is parallel to shaft $n'$. These shafts are journaled in a plate $y$, (omitted in Fig. 3,) which is secured to or formed integral with the nave $z$ and extends between the spokes $x$ and $x'$, Fig. 3, in the opposite direction to the crank-pin $a$. The shaft $r$ carries two pinions $t$ and $t'$, engaging two segmental gears $s$ and $s'$, respectively, of which one is located on the inner side of the shaft $r$ with reference to the shaft $c$ and the other on the outer side thereof. The segmental gears are arranged concentric with the shaft $c$ and are pivotally connected therewith through the medium of arms $s^2$. Near their outer ends the arms $s^2$ carry counterweights $u$.

The bolter-casing D is provided with fixed or vertically-adjustable weights Q, which are mounted upon standards $Q'$, secured to the casing, and serve to raise or lower the center of gravity of the said casing to bring it into the same horizontal plane with the center of gravity of the counterweights $u$ and thereby prevent vertical vibrations of the bolter-frame.

The bolter proper consists of the usual superposed sieves $C'$ to $C^7$ and is provided with a feed-hopper $b$, having a flexible tubular connection with the inlet-opening of the bolter-casing D and with discharge-tubes T. Partitions J and O divide the individual sieve-frames $m'$, Figs. 6 and $6^a$, into four longitudinal channels $D'$ and E. (Only one half of the width of the sieve is shown in Figs. 6 and $6^a$.) Cross-bars $k'$ $k^2$ $q'$ $q^2$ extend perpendicular to the partitions J and O, and to the under faces of the cross-bars $q'$ and $q^2$ are secured longitudinal bars $h'$ and $h^2$, which divide the channels $D'$ and E into two approximately equal parts. To both sides of the partitions J and to the outer sides of the bars $h'$ and $h^2$ are secured a series of curved hooks $g'$ $g^2$ $g^3$ $g^4$ $g^7$. A similar hook $g^5$ is secured to the cross-bar $k^2$ approximately in line with the longitudinal bar $h'$, and another hook $g^6$ is secured to a diagonal bar L in approximate alignment with the longitudinal bar $h^2$. The concavity of the curved hooks $g'$ $g^2$ $g^7$ faces in the direction in which it is desired to convey the material. Preferably the hooks are curved in the arc of a circle whose radius is equal to one-half of the eccentricity of the crank-pin $a$, and the ends of the concave surfaces of the hooks are essentially tangential to the directions in which they engage and release the material. The best results are obtained when the length of the channels $D'$ and E is about equal to four or five times the eccentricity of the crank-pin $a$, and the hooks $g^7$ project approximately to one-fifth of the width of the said channels. $C^8$ indicates the feed end of the sieve and F the delivery-opening.

The operation of the improved bolter is as follows: When the material to be sifted is fed to the bolter through the hopper $b$, the equilibrium of the bolter-frame is destroyed, and the shaft $c$, in consequence thereof, assumes an inclined position, so that its axis, instead of remaining stationary during its rotation, describes a conical surface. The shaft $c$ is capable of assuming an inclination, since the yielding ring $l$ permits of a lateral displacement of the shaft in its lower bearing, and the sleeves $f$ and $i$ have approximately conical outer surfaces. The ring $g$ permits the upper end of the shaft to move laterally. When the shaft is inclined as described, the friction-wheel $n$ is carried to an engagement with the inner surface $p$ of the annular groove $q$ of the stationary ring $o$, Fig. 4. The friction-wheel is thus rotated, and by means of the above-described gearing the segmental gears $s$ and $s'$ are turned to bring the counterweights $u$ out of their normal inactive position $u'$, Fig. 3, toward a point opposite to the crank-pin $a$ until the equilibrium is restored. When this result has been accomplished, the shaft $c$ resumes its vertical position, thereby carrying the friction-wheel $n$ out of engagement with the surface of the groove $q$ and causing the counterweights $u$ to remain in the position they have assumed. Should the supply of the material be decreased, the shaft $c$ will be inclined in the opposise direction to that above referred to, and thus the friction-wheel $n$ will be caused to engage with the outer surface of the groove $q$, whereby the said friction-wheel will be rotated in the opposite direction to that above mentioned, and the counterweights $u$ will be caused to approach their original position $u'$. It will be obvious that by these means the equilibrium of the bolter-frame will be automatically maintained when the weight of the material fed varies. The motion of the bolter therefore will be a regular one, and detrimental jerks and vibrations will be avoided, thereby reducing the strain to which the parts of the machine and the supports are subjected.

The advantages of the suspending devices have already been indicated in the description of these devices and consist in affording an easy means for effectively and automatically lubricating the joints of the suspension-rods with the bolter-frame and the stationary supports, and, further, in securing a uniform wear of the joints, thus avoiding injurious jerks that are due to uneven wear.

When the center of gravity of the counter-weights $u$ is not situated in the same horizontal plane with the center of gravity of the bolter-frame, (with the material therein,) the said frame is liable to oscillate up and down during its rotation, and this would produce detrimental vibrations of the machine. In order to remedy this defect, the weights Q have been provided, and it will be readily understood that by properly adjusting the said weights the center of gravity of the bolter-frame may be brought into the same horizontal plane with the center of gravity of the counterweights $u$, whereby the above-mentioned jerky or shaking motion is prevented.

The operation of the curved hooks or conveyers $g'$ $g^2$ $g^3$ is as follows: The hook $g'$ during the gyrating movement of the bolter will describe a circle $a'$ $a^2$ $a^3$ $a^4$, Fig. 6$^a$, whose radius is equal to the eccentricity of the crank-pin $a$. Since the curvature of the hook has a smaller radius than the eccentricity of the said crank-pin, the hook will securely hold a portion of the material and carry it forward from $a'$ to $a^2$ and $a^3$. At $a^3$ when the hook $g'$ commences to recede the material is released and the hook $g'$ returns to its original position, describing the arc $a^3$ $a^4$ $a'$. The momentum acquired by the material causes it to travel somewhat beyond the point $a^3$ after it has been released from the hook $g'$, and the material thus moves in a loop $a^3$ $a^5$ $a^6$, whereafter it is engaged or caught up by the concavity of the adjacent hook $g^3$ and is acted upon by this hook in the same manner that has been described with reference to the hook $g'$. It will be understood that the portions of the material that do not come in contact with the curved hooks are carried forward by the pressure exerted on them by the portions of the material acted on directly by the said hooks, and thus the entire mass is conveyed forward. The paths of travel of the several portions of the material have been indicated by dotted lines in Fig. 6$^a$, and consist of essentially cycloidal curves. It will be obvious that the curvature of the conveying-hook need not be an exact arc of a circle, but approximations to that shape will yield substantially the same result. It is, however, important that the radius of curvature of the conveying-hook should be smaller than the eccentricity of the crank-pin $a$, so that the hook will form a kind of pocket to hold the material. It is also preferable that the ends of the curved portion of the hooks should be approximately tangential to the direction in which the material is moving when it is engaged or released by the said hook.

The details of the invention may be varied without departing from the nature thereof as defined in the claims.

What I claim as my invention, and desire to secure by Letters Patent, is—

1. A gyrating bolter, provided with an operating shaft, a movable counter-weight connected to the said shaft, and means for automatically moving the said weight when the shaft assumes an inclined position, substantially as described.

2. A gyrating bolter, provided with an operating shaft, movable counter-weights pivotally connected with the shaft, and means for automatically moving the said weights when the shaft assumes an inclined position, substantially as described.

3. A gyrating bolter, provided with a shaft journaled in laterally movable bearings so as to be capable of assuming an inclined position, a movable weight connected to the shaft, a stationary track arranged concentrically with the shaft, and operating means connected with the movable weight and adapted to engage the said track when the shaft assumes an inclined position, substantially as described.

4. In a gyrating bolter, the combination, with the bolter frame and its operating shaft, of a stationary frame or casing through which passes the said shaft, movable bearings in which the shaft is journaled, the bearings being held in the stationary casing, a stationary grooved ring secured to the casing, a movable counter-weight connected to the shaft, a friction wheel connected to the shaft and arranged in the groove of the ring to engage the surface thereof when the shaft assumes an inclined position, and an operative connection between the said friction wheel and the movable counter-weight, substantially as described.

5. In a gyrating bolter, the combination with the bolter frame and its operating shaft, of a stationary frame or casing through which passes the said shaft, movable bearings in which the shaft is journaled, the bearings being held in the stationary casing, a stationary grooved ring secured to the casing, counter-weights pivotally connected with the shaft, segmental gears connected with the counter-weights, an essentially vertical shaft journaled in bearings rigidly connected with the operating shaft, the said vertical shaft carrying pinions engaging the said segmental gears, and a friction wheel operatively connected with the said vertical shaft, and arranged in the groove of the stationary ring, to engage the surface thereof when the operating shaft assumes an inclined position, substantially as described.

6. In a suspended gyrating bolter, the combination with the bolter frame and its operating shaft, the shaft being screw threaded at its upper end, of a nut fitted on the upper end of the shaft, the nut having a downwardly projecting cylindrical flange, a bearing provided with an annular groove in its upper surface, and bearing balls arranged in the said groove and adapted to support the said nut, substantially as described.

7. A gyrating bolter, provided with a bolter frame and an operating shaft therefor, a stationary casing through which passes the said shaft, a yielding ring located in the said casing, and a bearing sleeve interposed between the shaft and the ring, as and for the purpose set forth.

8. A gyrating bolter, provided with vertically-adjustable weights mounted on standards secured to the bolter frame, the weights having longitudinal movement on the standards, as and for the purpose set forth.

9. In a gyrating bolter, the combination, with the bolter frame and its operating shaft, of a counter-weight loosely connected to the shaft and capable of moving in an essentially horizontal plane, and vertically-adjustable weights secured to the bolter frame, as and for the purpose set forth.

In testimony that I claim the foregoing as my invention I have signed my name in presence of two subscribing witnesses.

NIELS NIELSEN.

Witnesses:
L. HOFMAN BURY,
FR. TOYBERG.